US006325286B1

(12) United States Patent
Howland et al.

(10) Patent No.: US 6,325,286 B1
(45) Date of Patent: Dec. 4, 2001

(54) CHEMICAL DISPENSING SYSTEM USING KEYBOARDLESS DATA ENTRY

(75) Inventors: David R. Howland, Aptos; Henry W. Cassady, Santa Cruz, both of CA (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 09/061,530

(22) Filed: Apr. 13, 1998

Related U.S. Application Data

(60) Provisional application No. 60/043,099, filed on Apr. 16, 1997.

(51) Int. Cl.[7] .................................................. G06F 7/08
(52) U.S. Cl. ........................... 235/381; 235/380; 235/375
(58) Field of Search .................................... 235/381, 375, 235/380, 383, 385, 382, 382.5, 456, 376; 434/353–360; 222/2, 108, 129.4, 249, 266; 141/83, 94, 198; 8/158; 68/12.18, 12.27, 17 R, 27

(56) References Cited

U.S. PATENT DOCUMENTS 3,904,079 * 9/1975 Kross .
4,153,895    5/1979 Weisbrod et al. .
4,578,569    3/1986 Arp et al. .
4,831,242    5/1989 Englehardt et al. .
5,225,977    7/1993 Hooper et al. .
5,390,385 *  2/1995 Beldham .
5,392,618    2/1995 Livingston et al. .
5,416,308    5/1995 Hood et al. .
5,500,050    3/1996 Chan et al. .
5,564,595   10/1996 Minissian .
5,711,673    1/1998 Grundy, Jr. .

* cited by examiner

Primary Examiner—Michael G Lee
Assistant Examiner—Jamara Franklin
(74) Attorney, Agent, or Firm—Townsend and Townsend and Crew LLP

(57) ABSTRACT

A chemical dispensing system features a card reader in data communication with a controller to programmably control the transfer of chemicals between a supply of chemicals and a washing chamber while allowing retention of a permanent record of the programmed status of the controller.

20 Claims, 7 Drawing Sheets

CHEMICAL DISPENSING SYSTEM USING KEYBOARDLESS DATA ENTRY

CROSS REFERENCE TO RELATED APPLICATIONS

This application is a nonprovisional application of U.S. provisional patent application "CHEMICAL DISPENSING SYSTEM USING KEYBOARDLESS DATA ENTRY," U.S. Ser. No. 60/043,099, filed Apr. 16, 1997, having David R. Howland and Henry W. Cassady listed as co-inventors and assigned to Nova Controls. The 60/043,099 application is hereby incorporated by reference in its entirety.

BACKGROUND OF THE INVENTION

Laundry Chemical Dispensers are provided to inject detergents, bleaches and other chemicals into commercial washing systems. Typically, a plurality of chemicals are injected at different intervals of a washing process. To reduce the cost of laundry services, it is desirable inject precise amounts of the chemicals for the specific type of washing to be performed. The type and amounts of chemicals to be injected into the washing process is dependent upon the items to be washed. For example, if sheets were to be washed, a predetermined quantity of detergent, bleach, soap or softener would be injected into the washing process. This aforementioned combination of chemicals is referred to as a "formula". The formula for washing rags stained with grease, however, would differ from the aforementioned formula for washing sheets. To that end, the dispensers must be programmed to enable dispensing of the various formulas. The number of formulas of a washing system varies greatly and may range from as few as one to a many as several dozen. Additionally, the time when the chemicals must be injected can be delayed from the time a washing process begins to the time when it is desired to inject the chemical.

To control the washing process of the various washing systems in a washing facility, washing facility management systems may include a centralized programmable controller. These programmable controllers usually consist of a computer, such as a personal computer, that has various interface devices coupled thereto, such as a keyboard and monitor. The controllers allow precise control over the washing process. In addition, a permanent record of the programmatic control for each of the washing systems may be maintained for reference. An example of such a washing facility management system is discussed in U.S. Pat. No. 5,225,977 to Hooper et al. A drawback with the centralized systems is that they are relatively expensive to implement requiring networking of the various washing systems in the washing facility. In addition, the cost of the central processor is typically fixed, making the same much more expensive for washing facilities having a relatively few number of washing systems.

The cost associated with networking the various washing systems associated with a washing facility may be reduced by uniquely associating a local controller with each of the washing systems. However, the costs saved by abrogating the need to network the washing systems is offset by the increased cost of the local controller. In addition, the local controllers often have a video display terminal and keyboard attached thereto which are subject to damage during normal use often necessitating repairs and increasing the cost of operating a washing facility having these features. Moreover, accessing the permanent record of the programmed status of the washing systems often requires accessing the local controller. The local controllers are not networked and require each local controller to be contacted to determine the programmed status of the same, thereby making use of the same cumbersome.

To avoid the costs associated with the aforementioned video display terminal and the keyboard, low cost controllers have been implemented. The low cost controllers are typically mounted locally with a washing system and include a simplified keyboard and display integrated into a relatively sturdy mount. The keyboard has a minimum amount of buttons and the display is typically capable of displaying a few characters at any given time. In this fashion, damage from normal use is avoided. Drawbacks associated with the low cost controllers is that the relatively few buttons makes the programming process cryptic, difficult to understand and lengthy. Typically, as with the aforementioned controllers, to retrieve data concerning the programmed status of a controller, access to each low cost controller is necessitated.

What is needed, therefore, is a programmably controlled chemical dispensing system having a local controller coupled to a washing system which is easily programmed and provides a record of the programmed status of each of the local controllers.

SUMMARY OF THE INVENTION

A chemical dispensing system features a card reader in data communication with a controller to programmably control the transfer of chemicals between a supply of chemicals and a washing chamber while allowing retention of a permanent record of the programmed status of the controller. Specifically, a data entry substrate is provided which is adapted to be selectively placed in data communication with the card reader. The substrate has a plurality of data entry regions arranged in a plurality of subsets with data entry regions of each of the plurality of subsets being collinear and extending along a line parallel to a longitudinal axis of the substrate. Each of the plurality of data entry regions of a given subset has a weighted value associated therewith that corresponds to operational parameters of the system. The line associated with each of the subsets extends between opposite ends of a sector of the substrate, with a weighted value associated with data entry regions of one of the plurality of subsets being greatest proximate to one of the opposed ends and weighted values associated with the remaining data entry regions of the subset decreasing in magnitude as a function of a distance from the same end. Indicia may be present on the substrate and disposed adjacent to data entry regions reciting the weighted value associated therewith. The operational parameters include a quantity of chemical to be transferred to the washing chamber.

The system includes a plurality of pumps coupled to both the supply of fluids and the washing chamber via a plurality of transfer tubes. The controller is in data communication with the pumps to regulate operation of the same. In this fashion, control of the transfer of the chemicals between the washing chamber and the supply is achieved. The supply of chemicals may include water, bleach, fabric softener and various detergents.

In operation, data is entered onto the substrate either by varying the optical contrast of the data entry regions, defining optically varied regions, or by forming an aperture therein, defining punched regions. The combined weighted value associated with each of the sectors of the substrate is dependent upon both the spatial position of the optically varied, or punched, region and the number thereof. After the data has been entered into the data entry regions, the substrate is placed into the card reader. The card reader interprets the data on the substrate and transmits the interpreted data to the controller which then operates on the same to regulate the operational parameters of the system. After the data has been read by the card reader, the substrate may be decoupled from the system and stored remotely at a centralized location.

For a further understanding of the objects and advantages of the present invention, reference should be made to the ensuing detailed description taken in conjunction with the accompanying drawings.

DETAILED DESCRIPTION OF THE PREFERRED EMBODIMENTS

Figure 1:
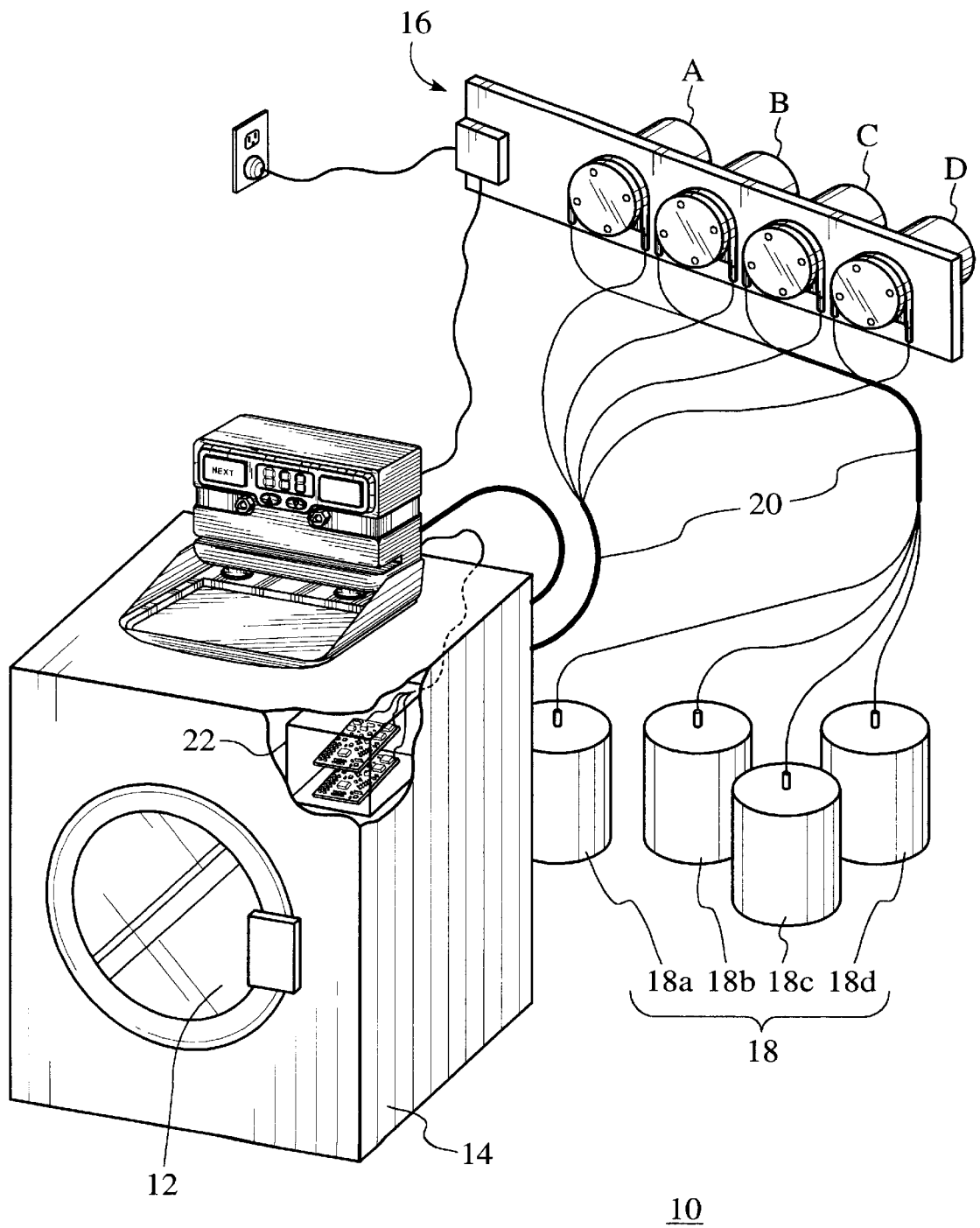
FIG. 1 is a perspective view of a chemical dispensing system in accordance with the present invention.

Referring to FIG. 1, a chemical dispensing system 10 includes a washing chamber 12, which is incorporated into a standard industrial washing system 14 and a plurality of pumps 16 which are coupled to the supply of chemicals 18 and the washing chamber 12 via a plurality of transfer tubes 20. Although any type of pump known in the art may be employed, typically each of the plurality of pumps 16 is a peristaltic pump.

To regulate the operations of the chemical dispensing system 10, a machine interface 22 is in data communication with the plurality of pumps 16. In this fashion, control of the transfer of the chemicals between the washing chamber 12 and the supply 18 is achieved. Although any number of receptacles may be included, depending upon the application, the supply of chemicals 18 includes four receptacles 18a, 18b, 18c and 18d, each of which stores a chemical. In the present example, receptacle 18a contains detergent break, receptacle 18b contains bleach, receptacle 18c contains detergent and receptacle 18d contains fabric softener. The washing system 14 is connected to a supply of water (not shown) such as a municipal water supply. The chemicals may be in either fluid or solid form.

Figure 2:
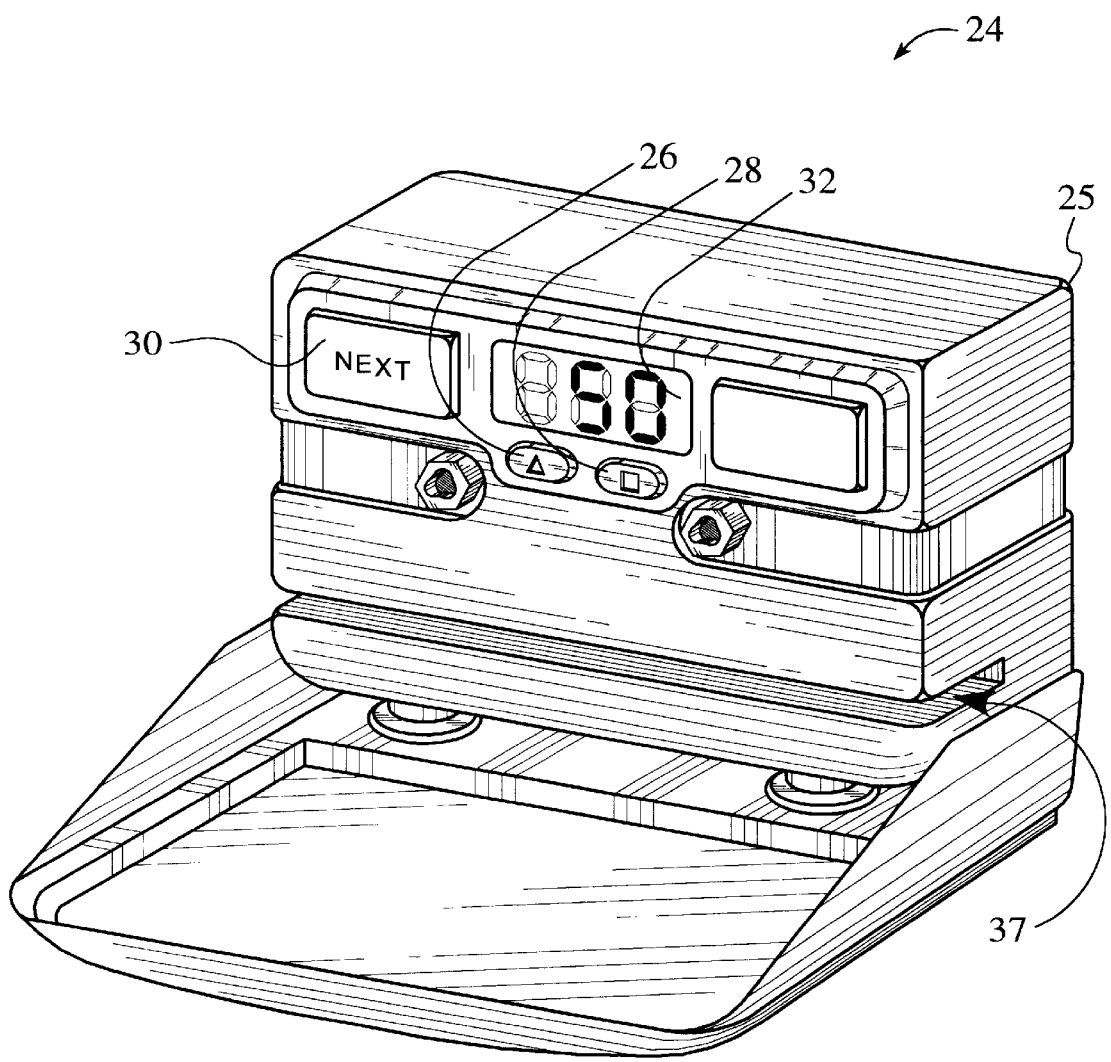
FIG. 2 is a detailed perspective view of a card reader shown above in FIG. 1.

Referring to both FIGS. 1 and 2, a program interface 24 is in data communication with the machine interface 22. The program interface 24 allows programmable control of the system 10 by programming a processor (not shown) contained in a housing 25 having a plurality of data input keys 26, 28, 30 and a display screen 32 mounted therein. Positioned at one edge of the housing 25 is an elongated slot 37 having optical sensing components therein (not shown) which facilitate data input, discussed more fully below. Any type of display may be employed, including, e.g., liquid crystal display, light emitting diodes (LEDs), cathode ray tube and the like. The aforementioned processor is connected to receive signals from the machine interface 22 through an optical interface (not shown) to electrically isolate the processor.

Operating chemical dispensing systems for profit often requires making the system flexible so as provide differing wash formulas, reducing the set-up, or programming time, and making the system friendly for an end user to operate. To that end, the program interface 24 has two operational modes: a user mode and an installer mode. The user mode facilitates selection of formula number and view load counts associated with the system 10. The installer mode facilitates priming and calibration of the plurality of pumps 16, as well as control of recordation of the system's operations, such as resetting of load counters, verification of formula programming and restricting access to the installer mode.

Figure 3:
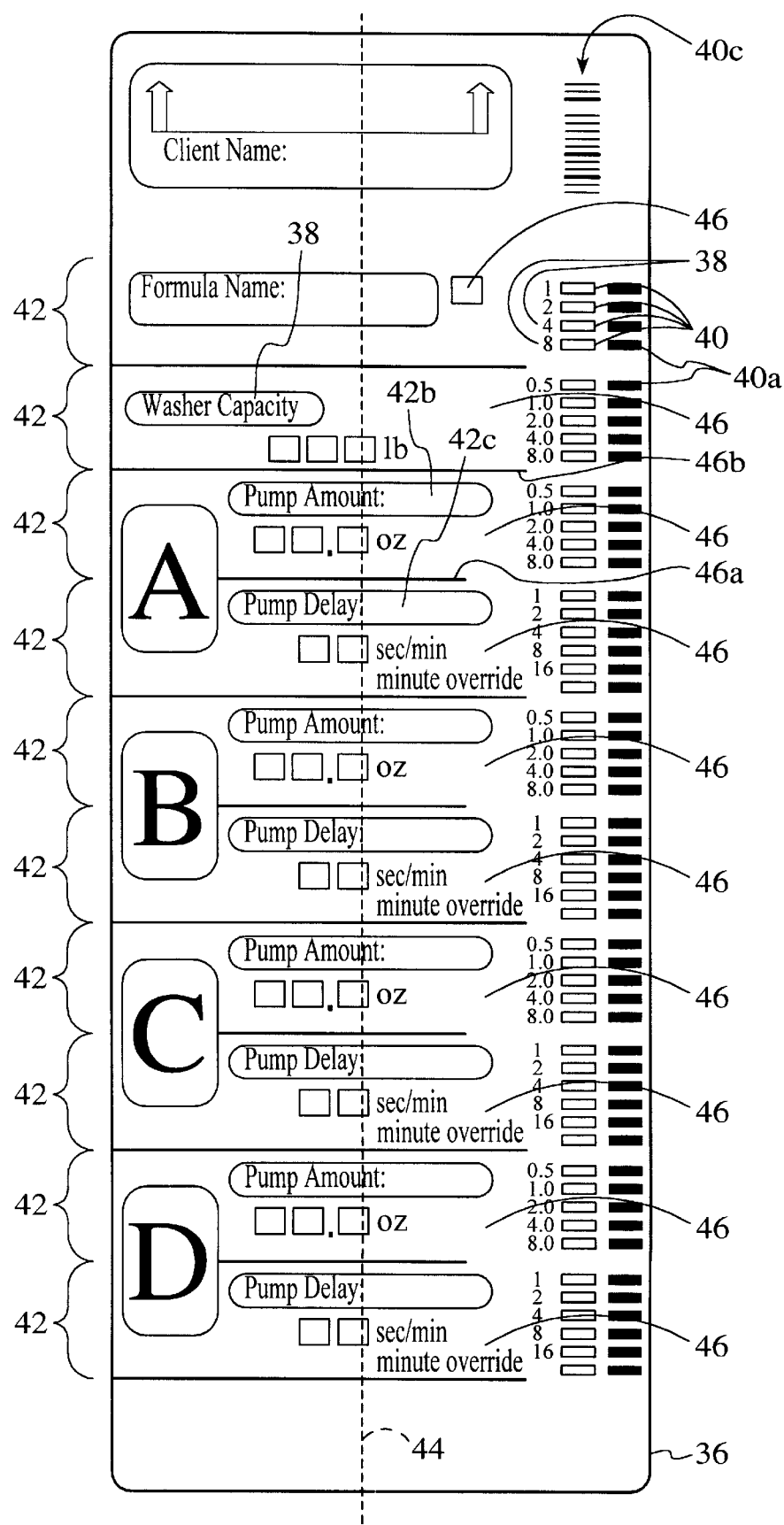
FIG. 3 is a plan view of one side of a data entry substrate which is selectively placed in data communication with the card reader shown above in FIGS. 1 and 2.
Figure 4:
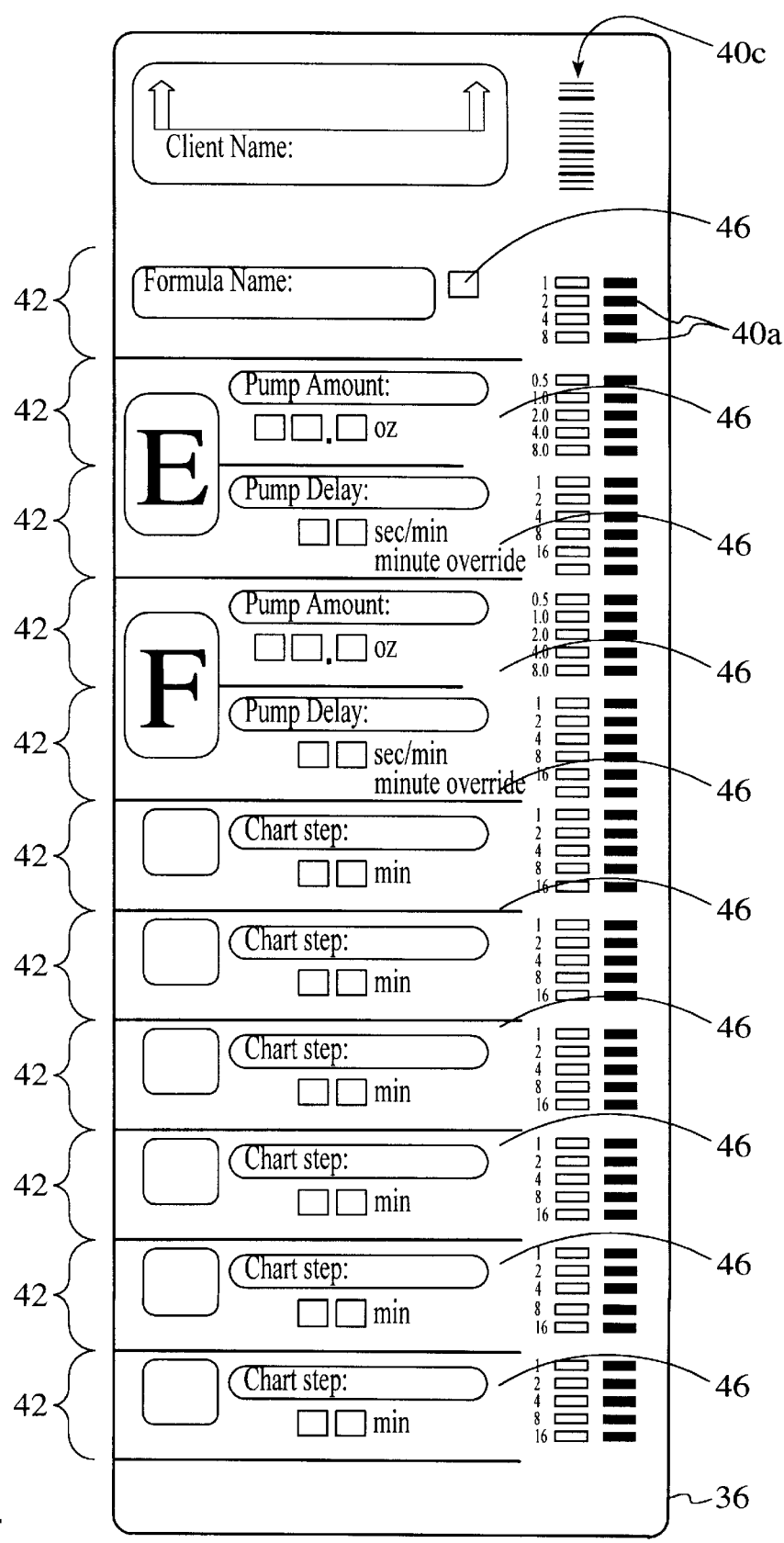
FIG. 4 is a plan view of an opposing side of the data entry substrate shown in FIG. 3.

Referring to FIGS. 2, 3 and 4, the card reader 24 reduces set-up time by allowing detection of data from a data entry substrate 36 that incorporates both instructions, such as indicia 38, and data entry regions 40. Specifically, the data entry substrate 36 is adapted to be selectively placed in data communication with the card reader 24, and the plurality of data entry regions 40 are arranged in a plurality of subsets 42. Typically, the data entry regions 40 of each of the plurality of subsets 42 are collinear, extending parallel to a longitudinal axis 44 of the data entry substrate 36. Each of the plurality of data entry regions 40 of a given subset 42 extends between opposed ends 46a and 46b of a sector 46 and has a weighted value associated therewith. The weighted value associated with a subgroup of the data entry regions corresponds to operational parameters of the system 10, with the weighted value associated with the data entry regions being greatest proximate to one of the opposed ends, such as end 46a. The weighted value associated with remaining data entry regions 40 of a particular subset 42 decrease in magnitude as a function of a distance from the end 46a, i.e., the closer the proximity of a data entry region 40 is to end 46b, the smaller the magnitude of the weighted value associated therewith.

The aforementioned operational parameters include a quantity of chemical to be transferred to the washing chamber 12 and the sequence in which the plurality of pumps 16 will transfer chemicals thereto by establishing a delay before chemical transfer. The delay is measured from a commencement of a washing cycle. For example, subset 42c shown on data entry substrate 36 corresponding to the indicia "A," corresponds to pump A of the plurality of pumps 16 shown in FIG. 1, and the weighted values associated with the data entry regions relate to a quantity of chemical pump A is to transfer between receptacle 18a and the washing chamber 12. Similarly, indicia "B," "C," and "D" shown on data entry substrate 36 in FIG. 3 correspond to pumps "B," "C," and "D" of the plurality of pumps 16 shown in FIG. 1. Indicia "E" and "F" shown on data entry substrate 36 in FIG. 4 correspond to additional pumps 16 not shown. The data regions 40 recited in subset 42c have the following weighted values: 0.5, 1.0, 2.0, 4.0 and 8.0 ounces. Each weighted value is uniquely associated with, and positioned adjacent to, one of the data entry regions 40. Information is entered into the subset 42c by varying the optical properties of the data entry regions 40 so that it contrasts with the area of the substrate surrounding the same. In the present embodiment, information is entered into the subset 42c by darkening one or more of the data entry regions 40 associated therewith, defining an optically contrasted data entry region. The information in a subset corresponds to a total weighted value that is dependent upon both the spatial position and number of optically contrasted data entry regions 40 in the subset 42c. To vary the optical contrast of the data entry regions 40, any one of numerous implements may be used, e.g., a marker, pen, pencil or the like.

Figure 5:
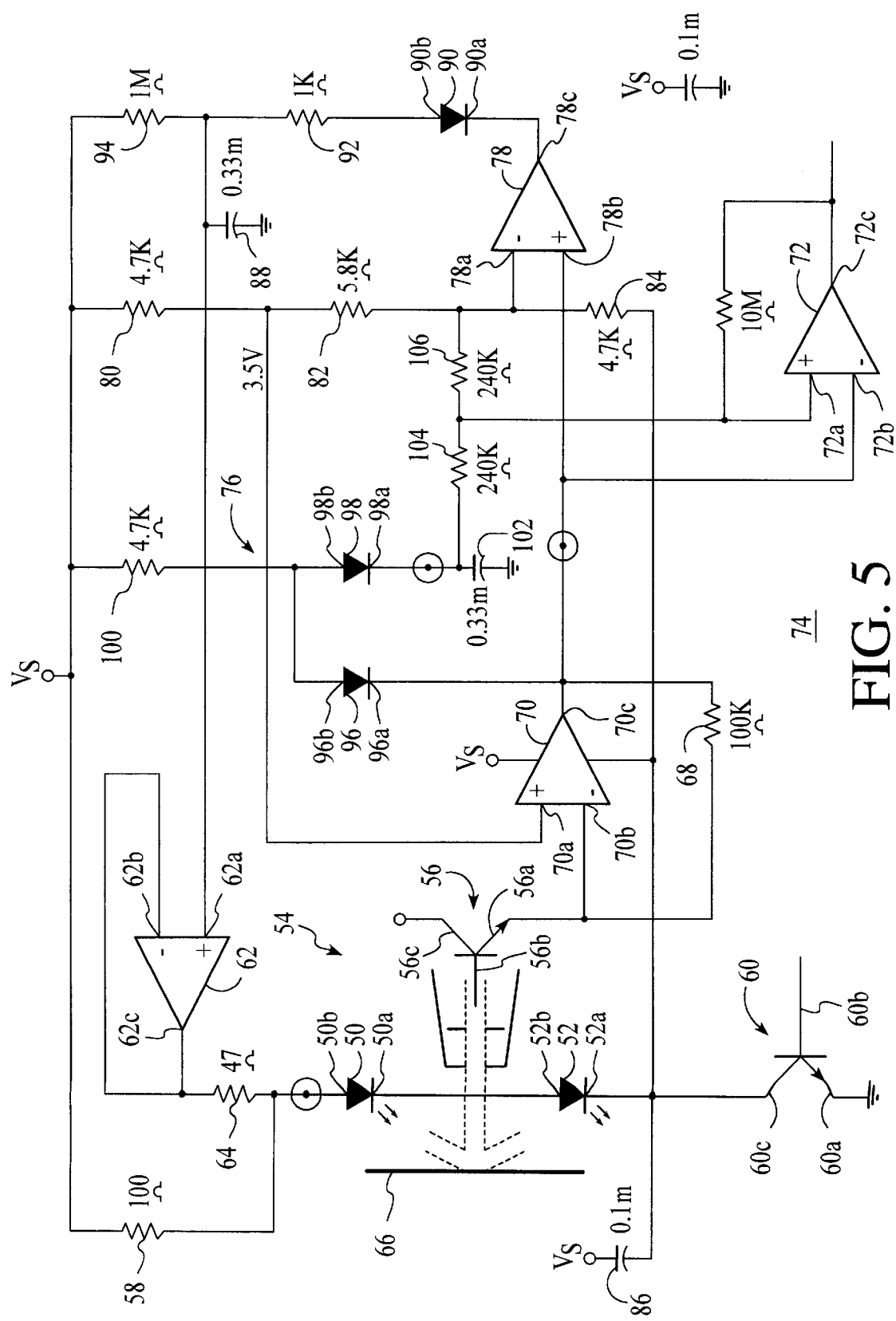
FIG. 5 is a schematic showing the components of the card reader shown above in FIGS. 1 and 2.

Referring to FIGS. 2, 3, and 5, to detect the information programmed into the data entry regions 40, card reader 24 must distinguish between two different levels of reflected radiation and the spatial positions at which a change in the radiation level is detected. This is achieved by having an optical detection system 48 including one or more illumination sources 50 and 52, a spatial filtering system 54, and an optical detector 56. Although any type of illumination source may be employed, typically illumination sources 50 and 52 include light emitting diodes (LEDs), with a cathode 50a of one coupled to the anode 52b of the other. The anode 50b of illumination source 50 is coupled to a supply voltage $V_s$ through a resistor 58, and a cathode 52a of illumination source 52 is connected to a collector 60c of a transistor 60, which functions as the on/off switch of the card reader 24. The emitter 60a of transistor 60 is connected to ground and the base 60b is connected to activations circuit (not shown).

The illumination sources 50 and 52 are driven by an operational amplifier 62 having unity gain. Specifically, the output 62c of the drive amplifier 62 is connected to the anode 50b of illumination source 50 through a resistor 64. The inverting input of the drive amplifier 62 is connected to the output 62c thereof. The non-inverting input 62a of the drive amplifier 62 is connected to a filtering circuit, discussed more fully below.

The optical detector 56 is of a type sufficient to detect the optical radiation emitted by the illumination sources 50 and 52. Typically, the optical detector 56 is a photosensitive transistor. A target plane 66 is defined by one edge of the slot 34 and positioned adjacent to optical detection system 48. The data entry substrate 36 is positioned adjacent to the target plane 66 and the radiation emitted by the illumination sources 50 and 52 is incident thereon, with radiation reflected therefrom impinging upon the optical detector 56.

The optical detector 56 includes an emitter 56a, a base 56b and a collector 56c, with the base 56b functioning as the optical detector. The collector 56c is connected to a supply voltage $V_s$ The optical sensor 56 produces a current in response to detecting radiation. The current is converted to a voltage by passing the current through a resistor 68 connected to the emitter 56a. The voltage is coupled to an inverting input 70a of an operational amplifier 70. Voltage present at the inverting input 70a is transmitted to the output 70c of the detector amplifier 70. The signal at the output 70c is sensed by the inverting input 72b of an output operational amplifier 72. If the signal at the inverting input 72b is above a predetermined threshold level, the same is transmitted to the output 72c as information which is interpreted by the controller (not shown).

To accurately read information from the data entry substrate 36, two filtering circuits 74 and 76 are coupled between the output 70c of the detector amplifier 70 and the inputs 72a and 72b of the output amplifier 72. High level radiation filter 74 prevents a signal from being present on the output 72c when high level of radiation is detected by the optical detector 56. To that end, the high level radiation filter ensures that the voltage levels at both the inputs 72a and 72b are substantially equal. This is achieved by connecting a non-inverting input 78a an operational amplifier 78, employed as a high level radiation detector, to the output of the detector amplifier 70. The inverting input 78b of the high level radiation detector 78 is set to about 1.5 volt with a resistive divider network consisting of 80, 82, and 84 which are coupled in series. Specifically, resistor 82 is connected between resistors 80 and 84, with both resistors 82 and 84 connected in common with the inverting input 78b. A side of resistor 80, opposite to resistor 82, is connected to the supply voltage $V_s$. A side of resistor 84, opposite to resistor 82, is connected in common with a capacitor 86 and the anode 52a of LED 52. A side of the capacitor 86, opposite to resistor 84 is connected to the supply voltage $V_s$.

Whenever a level of radiation detected by the optical detector 56 increases, the output of the detector amplifier 70 goes below 1.5 volts, i.e., exceeds the 1.5 volt threshold of the high level radiation amplifier 78. This produces a negative potential at the output 78c of the high level radiation detector 78. This results in the charging of a capacitor 88, coupled thereto, through a diode 90 connected thereto in series with a resistor 92, with the cathode 90a of the diode 90 being connected to the output 78c. In this fashion, the voltage on the capacitor 88 is forced down whenever the light level detected results in the voltage level on input 78a going below the 1.5 volt threshold.

The voltage level charge status of the capacitor 88 regulates the operation of the drive amplifier 62. Specifically, the non-inverting input 62a of the drive amplifier 62 is connected to one side of capacitor 88, with the opposite side of the capacitor 88 being connected to ground. If the radiation sensed by optical detector 56 goes above a preset level, i.e., the voltage sensed by the non-inverting input 62a of the drive amplifier 62 is reduced, thereby reducing the brightness of the illumination sources 50 and 52. In this manner, high level radiation filter 74 functions as an automatic gain control. To ensure that the voltage levels at the inputs 72a and 72b of the output amplifier 72 are equal which the optical detector 56 senses an increase in radiation, the filter charges the capacitor 88, to a negative voltage, much more rapidly than discharge of the same occurs. To that end, a resistor 94 is coupled so that one side is connected in common with both resistor 92 and capacitor 88. The remaining side of the resistor 94 is connected to the voltage supply $V_s$. The aforementioned temporal relationship between charge and discharge of the capacitor 88 is achieved by having the value of resistor 94 being much greater than the value of resistor 92.

To reduce the probability that the low radiation level signal is interpreted as a high radiation level signal, the low radiation level filter 76 is configured to detect the darkest signal present. In this fashion, problems with reflectivity of ambient light from the darkened areas of the substrate 36 are avoided. Such light may be interpreted as being high level radiation. The darkest signal present is detected by connecting together the anodes 96b and 98b of two diodes 96 and 98 to one side of a resistor 100 with the opposite side connected to the supply voltage $V_s$, and the cathode 96a of diode 96 connected to the output 70c. The cathode 98a of diode 98 is connected to one side of a capacitor 102 and a resistor 104. The opposite side of the capacitor 102 is connected to ground, and the opposite side of resistor 104 is connected to resistor 106. The side of the resistor 106, opposite to resistor 104, is connected to the inverting input 78b and, therefore, is held at 1.5 volts. In this configuration, as voltage on output 70c goes higher, capacitor 102 will follow, because the diodes 96 and 98 are balanced. Discharge of the capacitor 102 is through resistors 104 and 106. In this fashion, the capacitor 102 quickly charges to a positive voltage, but discharges much more slowly than it charges.

A problem was encountered due to the conflicting parameters of the sensitivity and frequency response of the optical detector 56. Specifically, it was discovered that the sensitivity of the optical detector is proportional to the value of the resistor 68, but the frequency response of the same was inversely proportional. As a result, optical sensitivity could be achieved by employing a resistor having a value approximately 100K ohms, but the frequency response of the optical detector 56 was restricted. This resulted in erroneous readings of a data entry substrate 36 which is scanned passed the optical sensor 54 at moderate speeds. To avoid the aforementioned problem, the detector amplifier 70 is employed having the feedback resistor 68 coupled between the input 70*b* and the output 70*c* with the emitter 56*a* of the optical detector 56 coupled to input 70*b*. This structure allows the sensitivity of the optical sensor 54 to be established independent of the frequency response of the same, i.e., the benefit of the full gain afforded by resistor 68 may be obtained without substantial loss in frequency response.

Figure 6:
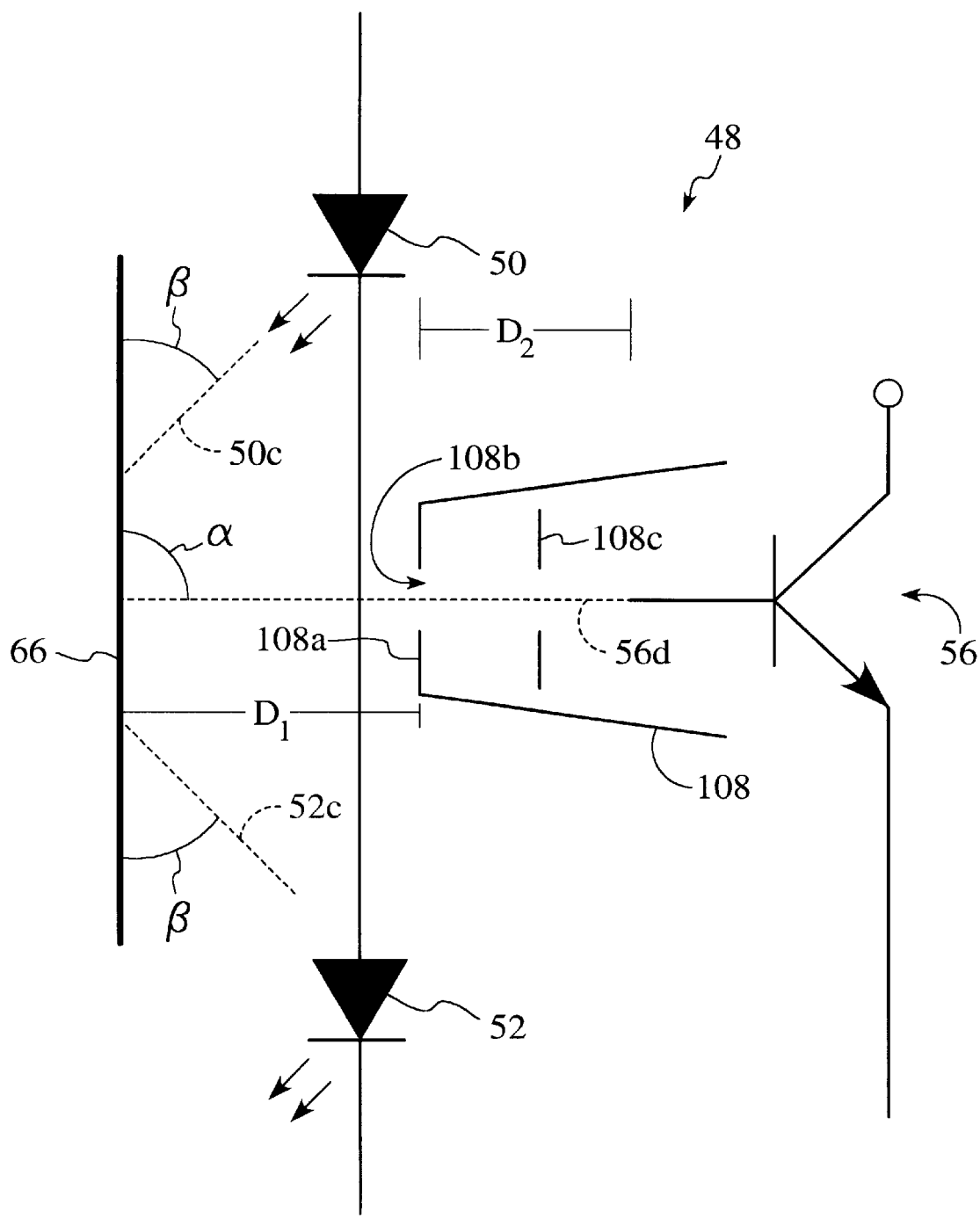
FIG. 6 is a detailed schematic view of an optical detection system shown in FIG. 5.
Figure 7:
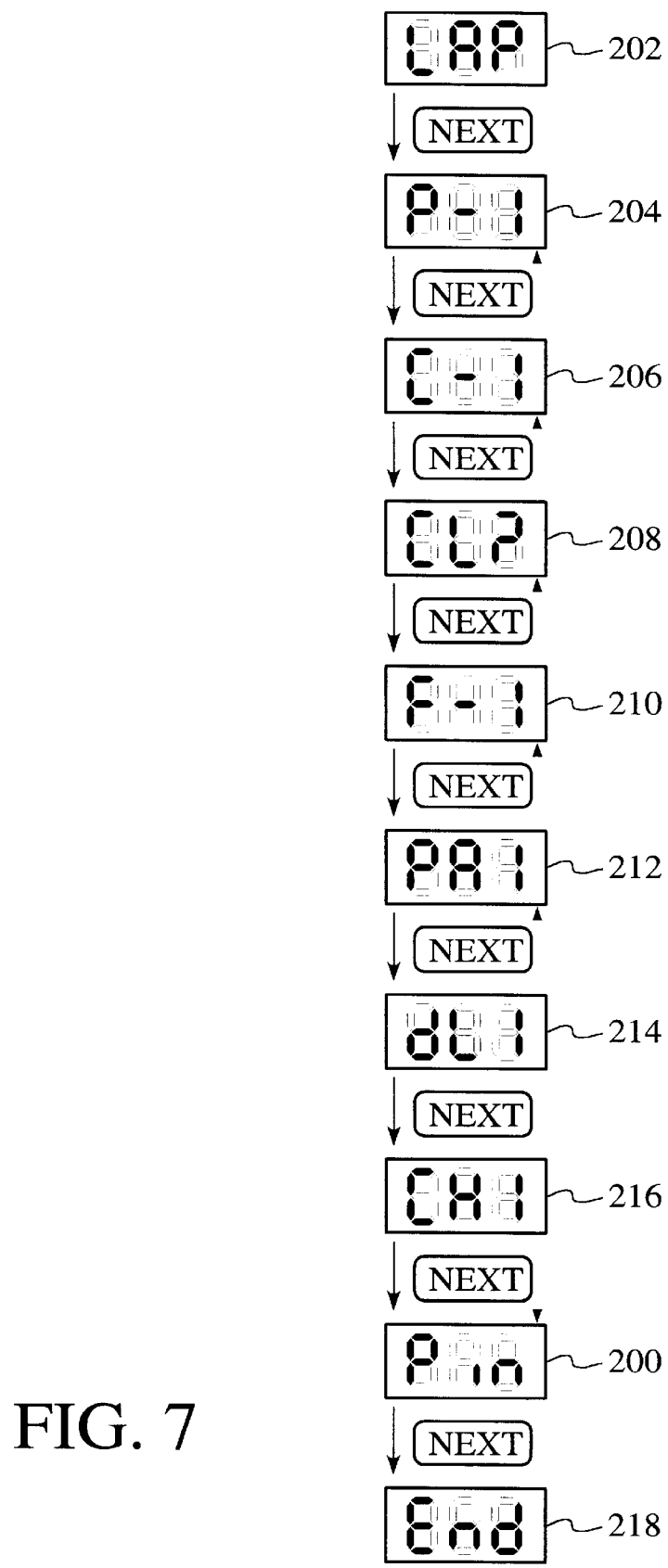
FIG. 7 is a plan view of various screens shown on a display of the card reader shown in FIG. 2.

Referring to FIG. 6, to minimize the cost of the optical detection system 48, the need for lenses was abrogated, while making the same suitable for detection of information inserted by various implements, as discussed above. However, a problem was encountered with one of the most common implements. Specifically, it was found that if the illuminating radiation impinged upon pencil marks, specularly reflected radiation would be produced which prevented detection of the information were the detection angle α is equal to the illumination angle β. The detection angle α is measured between an optical axis 56*d* of the optical detector 56 and the target plane 66. The illumination angle β is measured between one of the optical axes 50*c* and 52*d* of the illumination sources 50 and 52, respectively, and the target plane. To avoid this problem the illumination sources 50 and 52 and the optical detector 56 are positioned with respect to the target plane 66 to ensure that the angle detection angle α is not equal to the illumination angle β. To that end, radiation is directed toward the target plane 66 at an oblique angle. Although the illumination angle β and the detection angle α may be virtually any two angles, so long as they are not equal, typically illumination angle β, is approximately 45° with respect to the target plane 66. The detection angle α is typically 90° with respect to the target plane 66.

To reduce the probability that the optical detector 56 detects non-reflected radiation, the same is isolated from incident radiation from the illumination sources 50 and 52 by an optically opaque body 108. The body 108 is formed from a malleability inexpensive metal, such as brass, which is darkened by a process known to those skilled in the art. At the end of the shield 108, positioned proximate to the target plane 66, is a terminus 108*a* having an aperture 108*b* formed therein. The shape of the aperture 108*b* is selected so that the optical detector 56 senses an elongated line of reflected radiation, a longitudinal axis of which extends parallel to the longitudinal axis of each of the data regions 40. This was found to produce the best resolution for detecting the data regions, with the best resolution being defined as follows:

$$\text{resolution} = [a(D_2 D_1)] + W$$

where "a" is the area of the slit along the longitudinal axis, "$D_2$" is the distance between the optical detector 56 and the aperture 108*b*, "$D_1$" is the distance between the aperture 108*b* and the target plane 66 and W is the area of the optical detector 56. Although an optical lens may be employed to focus reflected light on the optical detector 56, it greatly increases the cost of the optical detection system 48 and is not preferred. Finally, to increase the resolution of the optical detector 56, the opaque body 108 may include a spatial filter 108*c* positioned between the aperture 108*b* and the optical detector 56. The spatial filter 108*c* has an aperture with an area slightly smaller than the area of the optical sensing portion of the optical detector 56, with the aperture disposed in the optical axes 56*d*.

Referring to FIGS. 3 and 5, in operation, data is entered onto the data entry substrate 36 substrate by darkening the desired data regions 40. The data entry substrate 36 is then inserted into the slot 34 so that the data entry regions 40 face the illumination sources 50 and 52. The substrate is then slid along a direction, thereby scanning the card across both of the illumination sources 50 and 52 as well as the optical detector 56. In this fashion, all information entered into the data entry regions 40 is read by the optical detection system 48. Signals are generated by the detector amplifier 70 indicating the detection of both high level radiation and low level radiation. The high level radiation is associated with data regions 40 not containing information, as well as regions of the substrate located outside of the data entry regions. The low level radiation is associated with data entry regions 40 containing information therein, i.e., optically contrasted data entry regions 40. To facilitate movement of the data entry substrate 36, a felt pad may be disposed in the slot 34. A optically transparent shield may be positioned between the slot and the optical detector 56 to prevent contamination of the same.

The weighted value associated with the data entry regions 40 may be determined by including adjacent to each of the data entry regions, an index mark 40*a*. In this fashion, an index region 40*b* is formed on one of edge of the data substrate 36. The index region may be sensed by a second optical detection system (not shown). In this manner, information concerning the index marks is transmitted to the controller which interprets the information to determine the sector 46 and the weighted value associated with a particular data entry region 40. Typically, the data entry substrate 36 will have header information 40*c* associated therewith. The header information 40*c* can include the type of machine being programmed, the units which are being employed, e.g., metric or english standard units and any other information deemed necessary. The header information 40*c* will be associated with a predetermined number of data entry regions. After detecting the predetermined number of data entry regions, the controller will interpret all subsequent information from the data entry substrate as discussed above. Alternatively, the header information 40*c* may simply be bar encoded information which would be sensed by a bar code reader known to one skilled in the art.

Referring to FIGS. 1, 2, 7 and 10, to configure the system 10, an installer depresses and holds button 28 for approximately two seconds to obtain the password input screen 200. Button 26 is employed to select the proper input code. Button 30 is employed to select a different digit. This process is repeated for each digit on the display 32. The default password is 123. The card reader 24 will return to User Mode after 10 seconds of inactivity.

After entering the password, the display 24 will automatically provide a visual representation of the system capacity screen 202 every two seconds. The system capacity screen indicates the programmed capacity of the system 10, which is used to scale actual pump quantity when reading the information concerning the same from the data entry substrate 36.

To prime pumps 16, button 30 is depressed to select the prime pump screen 204. To select the proper value of a digit on the display 32, i.e., pump number, button 26 is depressed. Button 28 is depressed to start the pump and depressed again to stop the pump. These steps are repeated for all desired pumps.

Calibration of the pumps 16 is achieved by depressing button 30 to obtain calibration screen 206. Every two seconds the display 32 toggles back and forth between visual representations indicating a pump number and a pump calibration time. Button 26 is depressed to select the pump number to be calibrated. As before, button 28 is depressed to activate the pump selected and depressed again to deactivate the pump. Each of the pumps 16 is calibrated in this fashion.

To view and/or reset load counters, button 30 is depressed to obtain load counter screen 208. Every two seconds the screen 208 displays total load counts for all formulas. Button 28 is depressed to reset the load counters.

The formula which is employed in the system 10 is verified by depressing the button 30 to obtain the formula screen 210. Button 26 is depressed to sect the formula to be verified. Every two seconds the display 32 toggles back and forth between visual representations of the formula number and the status of the last read of a data entry substrate 36. A visual representation of cd1 indicates that most recent card read was side 1, and a visual representation of cd2 indicates that most recent card read was side 2. Err indicates a card read error. Depress button 28 to verify information read from the data entry substrate 36. Depress button 26 to step through all sector 46 of both sides of the most recently read data entry substrate 36. Depress button 28 to exit the data entry substrate 36 review function.

To view and/or test run scaled pump amounts for the formula number selected above, depress button 30 to select the screen display 212. Depress button 26 to select the pump number to be tested. Every two seconds the display 32 toggles back and forth between visual representations of the pump number and scaled pump quantity. Depressing button 28 activates the selected pump. To deactivate the selected pump before the aforementioned quantity is transferred, depress button 28 otherwise, the pump automatically deactivates.

To view the pump delay time, for the formula number selected when formula verify screen 210 is displayed, depress button 30 until screen 214 is displayed. Button 26 is employed to select the pump desired. Every two seconds the display 32 toggles back and forth between visual representations of the pump number and delay time in minutes or seconds. Delay Times in minutes are indicated with a decimal point between the middle and right digits.

A visual representation of a chart stop time screen 216 is displayed by using button 30. Button 26 is employed to change between pumps to view the chart stop times associated therewith. Every two seconds the display 32 toggles back and forth between visual representations of the pump number and the chart stop time in minutes.

Finally, the installer mode is exited by using button 30 to provide a visual representation of the end screen 218. Button 28 is then depressed to exit the installer mode.

Although the forgoing discussion has been directed to an optical card reader, it should be understood that a mechanical card reader may be employed to read information corresponding to apertures formed in the data entry substrate. Moreover, the card readers described above may be employed in other types of vending machines, including a laundry dryer and food dispensing machines. More specifically, the card reader may be employed in a chemical dispensing system of the type having one or more hoppers with a solid or powdered chemical placed therein. A solenoid is included with controls delivery of water to the hoppers. The water entering the hoppers makes the chemicals flowable so as to enter a washing chamber, either under force of gravity or through a pumping action. Therefore, the invention should not be determined with reference the description, but instead from the claims attached hereto along with the full scope of equivalents thereof.

What is claimed is:

1. A method of operating a chemical dispensing system of the type including a plurality of supplies of chemicals, a chamber coupled to said supply, a plurality of pumps each of which is in fluid communication with one of said plurality of supplies, and a controller, in data communication with both said chamber and said pumps, to regulate the transfer of fluid chemicals between said plurality of supplies and said chamber using operating data, said method comprising the steps of:

providing a data entry substrate adapted to be selectively placed in data communication with said controller, said substrate having a plurality of machine readable data entry regions arranged at differing spatial positions and adapted to contain operating data for use by said controller, and human readable indicia in selected corresponding locations arranged to direct the entry of operating data in corresponding data entry regions; and, establishing operational parameters for said plurality of pumps by entering operating data in said plurality of data entry regions, and placing said substrate in data communication with said controller.

2. The method as recited in claim 1 wherein said operational parameters include a quantity of liquid to be transferred between said supplies and said chamber.

3. The method as recited in claim 2 wherein said step of establishing operational parameters further includes a step of varying an optical contrast of said data entry regions, defining a varied region, with said operational parameters being established as a function of both a spatial position of said varied region and a quantity of varied regions present.

4. The method as recited in claim 2 wherein said step of establishing operational parameters further includes a step of forming an aperture in said data entry regions, defining a punched region, with said operational parameters being established as a function of both a spatial position of said punched region and a quantity of punched regions present.

5. A chemical dispensing system, comprising:

a supply of chemicals and a plurality of pumps in fluid communication therewith;

a chamber coupled to said supply;

a controller in data communication with said chamber and said pumps, said controller adapted to employ operating data, including operational parameters for said pumps, to control the transfer of fluid chemicals between said supply and said chamber;

a card reader in data communication with said controller and adapted to read machine readable operating data from a data entry substrate; and said data entry substrate adapted to be selectively placed in data communication with said card reader, said data entry substrate having a plurality of machine readable data entry regions arranged at differing spatial positions and adapted to contain operating data for use by said controller, and human readable indicia in selected corresponding locations arranged to direct the entry of operating data in corresponding data entry regions, whereby upon entry of operating data into said data entry regions and placing said data entry substrate in data communication with said card reader, said operating data is communicated to said controller.

6. The dispensing system as recited in claim 5 wherein said data entry substrate has a longitudinal axis, and wherein said plurality of data entry regions are arranged collinearly and extending along a line parallel to said axis, with each of said data regions having a weighted value associated therewith, with weighted values associated with a subset of said plurality of data regions being dependent upon a spatial position of the data region, of the subset, along said line.

7. The dispensing system as recited in claim 6 wherein said line extends between opposed ends of said substrate with a weighted value associated with data entry regions of said subset being greatest proximate to one of said opposed ends and weighted values associated with the remaining data entry regions of said subset decreasing in magnitude as a function of a distance from said one of said opposed ends.

8. The dispensing system as recited in claim 6 wherein said weighted values associated with said subset correspond to a quantity of chemical said controller is to transmit to said chamber.

9. The dispensing system as recited in claim 5 wherein said plurality of data entry regions are arranged at differing spatial positions, with each of said plurality of data entry regions having a weighted value associated therewith, with weighted values associated with a subset of said plurality of data entry regions being dependent upon the spatial position of the data entry regions of said subset in said substrate, with indicia being disposed adjacent to data entry regions of said subset reciting the weighted value associated therewith.

10. The dispensing system as recited in claim 5 wherein said card reader includes a marked card reader.

11. The dispensing system as recited in claim 5 where said card reader includes a punched-card reader.

12. The dispensing system as recited in claim 5 further including a plurality of pumps coupled to said supply and said chamber, said plurality of pumps in data communication with said controller.

13. The dispensing system as recited in claim 12 wherein said operating data includes operating data for said pumps.

14. The dispensing system as recited in claim 5 wherein said data entry substrate further includes human readable indicia arranged to direct recording said operating data on said substrate in selected corresponding locations in human readable format.

15. The dispensing system as recited in claim 5 wherein said data entry regions are arranged collinearly on said data entry substrate.

16. The dispensing system as recited in claim 15 wherein said human readable indicia are arranged adjacent corresponding data entry regions.

17. The dispensing system as recited in claim 15 wherein said card reader includes an elongate slot for receiving said data entry substrate in substantially linear sliding relation, and circuitry for sequentially reading operating data from the data entry regions on said data entry substrate as said data entry substrate slides in said slot.

18. The dispensing system as recited in claim 5 wherein said data entry regions are adapted to contain operating data including a quantity of chemical to be transferred and a time for chemical to be transferred.

19. The dispensing system as recited in claim 5 wherein said data entry substrate further includes machine readable header information in a selected location, which header information is adapted to be commonly associated with the operating data in a predetermined number of said plurality of data entry regions.

20. The dispensing system as recited in claim 19 wherein said header information includes information relating to a machine type and programming units.

\* \* \* \* \*